US 12,542,698 B2

(12) United States Patent
Chung et al.

(10) Patent No.: US 12,542,698 B2
(45) Date of Patent: Feb. 3, 2026

(54) SAMPLER INPUT CALIBRATION IN A SERDES RECEIVER USING A SELF-GENERATED REFERENCE VOLTAGE

(71) Applicant: QUALCOMM Incorporated, San Diego, CA (US)

(72) Inventors: Younwoong Chung, San Diego, CA (US); Yu Song, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 96 days.

(21) Appl. No.: 18/582,027

(22) Filed: Feb. 20, 2024

(65) Prior Publication Data
US 2025/0267047 A1    Aug. 21, 2025

(51) Int. Cl.
*H04L 25/03*    (2006.01)
*H04L 25/02*    (2006.01)
*H04L 25/49*    (2006.01)

(52) U.S. Cl.
CPC ...... *H04L 25/03878* (2013.01); *H04L 25/028* (2013.01); *H04L 25/4917* (2013.01)

(58) Field of Classification Search
CPC ............. H04L 25/03878; H04L 25/028; H04L 25/4917
USPC ................................................. 375/230–233
See application file for complete search history.

(56) References Cited

U.S. PATENT DOCUMENTS

| 6,147,631 | A | 11/2000 | Maulik et al. |
| 7,471,107 | B1 | 12/2008 | Fortin et al. |
| 9,531,382 | B1* | 12/2016 | Miwa ................... H03K 19/003 |
| 9,722,820 | B1* | 8/2017 | Hekmat ............ H04L 25/03146 |
| 9,876,656 | B1* | 1/2018 | Freitas .............. H04L 25/03133 |
| 2002/0125950 | A1* | 9/2002 | Abe ..................... H03F 3/45219 |
| | | | 330/253 |
| 2003/0025526 | A1 | 2/2003 | Tamura et al. |
| 2012/0235763 | A1* | 9/2012 | Lee .......................... H04B 3/04 |
| | | | 333/18 |
| 2014/0218081 | A1* | 8/2014 | Shinmyo .............. H03K 17/145 |
| | | | 327/212 |

(Continued)

FOREIGN PATENT DOCUMENTS

EP    2830214 A2    1/2015

OTHER PUBLICATIONS

International Search Report and Written Opinion—PCT/US2025/014474—ISA/EPO—May 16, 2025.

*Primary Examiner* — Emmanuel Bayard
(74) *Attorney, Agent, or Firm* — Loza & Loza, LLP

(57) ABSTRACT

A calibration circuit includes a replica summing circuit, a replica sampling circuit and a control circuit. The replica summing circuit is a replica of a sampling circuit in a serializer/deserializer (SerDes) interface and is configured to provide a summer output signal that is representative of a common mode voltage at an input of the SerDes interface. The replica sampling circuit is a replica of a sampling circuit in the SerDes interface. The replica sampling circuit includes a first input transistor having a gate coupled to the summer output signal and a second input transistor configured to provide an internal reference voltage at its drain. The drain of the second input transistor is coupled to a gate of the second input transistor. The control circuit is configured to control current flow in the replica summing circuit in response to a calibration signal output by the replica sampling circuit.

6 Claims, 11 Drawing Sheets

(56) References Cited

U.S. PATENT DOCUMENTS

| | | | |
|---|---|---|---|
| 2015/0358005 A1 | 12/2015 | Chen et al. | |
| 2017/0141785 A1* | 5/2017 | Beukema | H03M 1/361 |
| 2018/0167240 A1* | 6/2018 | Li | H04B 1/16 |
| 2018/0302053 A1* | 10/2018 | Tajalli | H04L 25/0272 |
| 2019/0173436 A1 | 6/2019 | Kim et al. | |
| 2019/0207621 A1* | 7/2019 | Tanaka | H03M 3/426 |
| 2021/0083706 A1* | 3/2021 | Iwai | H04L 25/03057 |
| 2021/0266200 A1* | 8/2021 | Yang | H04L 25/03885 |

* cited by examiner

SAMPLER INPUT CALIBRATION IN A SERDES RECEIVER USING A SELF-GENERATED REFERENCE VOLTAGE

TECHNICAL FIELD

The present disclosure generally relates to high-speed data communication interfaces that use serializers and/or deserializers and, more particularly, to dynamic control of current sources in summing circuits.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high speed bus interface for communication of signals between hardware components. For example, the high-speed bus interface may be implemented using a Peripheral Component Interconnect Express (PCIe) bus. High frequency signals may be equalized at a receiver. The receiver may utilize a combination of summing and sampling circuits when processing received signals. The performance of these circuits can be adversely affected by changes or variations in the common-mode voltage associated with the received signals. There is an ongoing need for improved circuits that are used to equalize and amplify or otherwise process signals received via the bus interface.

SUMMARY

Certain aspects of the disclosure relate to systems, apparatus, methods and techniques for dynamically calibrating gain in a high-frequency interface that includes a serializer/deserializer (SerDes). Dynamically controlling reference voltages can enable reliable operation notwithstanding changes in process parameters, voltage and/or temperature.

In various aspects of the disclosure, a calibration circuit includes a replica summing circuit, a replica sampling circuit and a control circuit. The replica summing circuit is a replica of a sampling circuit in the SerDes interface and is configured to provide a summer output signal that is representative of a common mode voltage at an input of the SerDes interface. The replica sampling circuit is a replica of a sampling circuit in the SerDes interface. The replica sampling circuit may include a first input transistor having a gate that is coupled to the summer output signal and a second input transistor configured to provide an internal reference voltage at its drain. The drain of the second input transistor may be coupled to a gate of the second input transistor. The control circuit may be configured to control current flow in the replica summing circuit in response to a calibration signal output by the replica sampling circuit.

In various aspects of the disclosure, an apparatus has means for generating a summer output signal that is representative of a common mode voltage at an input of a serializer/deserializer (SerDes) interface, including a replica of a summing circuit that is provided in the SerDes interface, means for comparing the summer output signal to an internal reference voltage in a replica of a sampling circuit in the SerDes interface, the internal reference voltage being provided by a diode connected transistor, and means for controlling current flow in the replica of the summing circuit based on a calibration signal output by the replica sampling circuit.

In various aspects of the disclosure, a method for calibrating a summing circuit includes using a replica of a summing circuit in a serializer/deserializer (SerDes) interface to generate a summer output signal that is representative of a common mode voltage at an input of the SerDes interface, comparing the summer output signal to an internal reference voltage in a replica of a sampling circuit in the SerDes interface, and controlling current flow in the replica of the summing circuit in response to a calibration signal output by the replica of the sampling circuit. The replica of the sampling circuit may include a first input transistor having a gate that is coupled to the summer output signal, and a second input transistor configured to provide the internal reference voltage at its drain. The drain of the second input transistor may be coupled to a gate of the second input transistor.

In one aspect, the summer output signal has a voltage level that is defined by an integral of the current flow in the replica of the summing circuit over a period of time. The period of time may be defined by a clock signal.

In one aspect, current flow in the replica of the summing circuit may be controlled by configuring a current source using a calibration code. Current flow in the replica of the summing circuit may be controlled by configuring a current source based on a tap coefficient defined for a decision-feedback equalizer.

In certain aspects, current flow in a summing circuit in the SerDes interface may be controlled in response to the calibration signal output by the replica sampling circuit. In some instances, a same level of current may be caused to flow in the replica of the summing circuit and the summing circuit in the SerDes interface.

In various aspects of the disclosure, a calibration circuit has a replica summer and a replica sampling circuit. The replica summer includes a pair of summing input transistors, each summing input transistor having a gate configured to receive an input signal representative of a common mode voltage of an input to an analog front-end circuit, a drain coupled to a summer output signal, and a source coupled to at least one summer source transistor that is configured to control currents flowing in the pair of summing input transistors. The replica sampling circuit includes a pair of sampling input transistors, including a first sampling input transistor that has a gate configured to receive the summer output signal, a source coupled to a sampling source transistor that is configured to control currents flowing in each of the sampling input transistors, and a drain coupled to a first feedback signal. A second sampling input transistor is a diode connected transistor that has a gate and a drain coupled to a second feedback signal.

DETAILED DESCRIPTION

Figure 1:
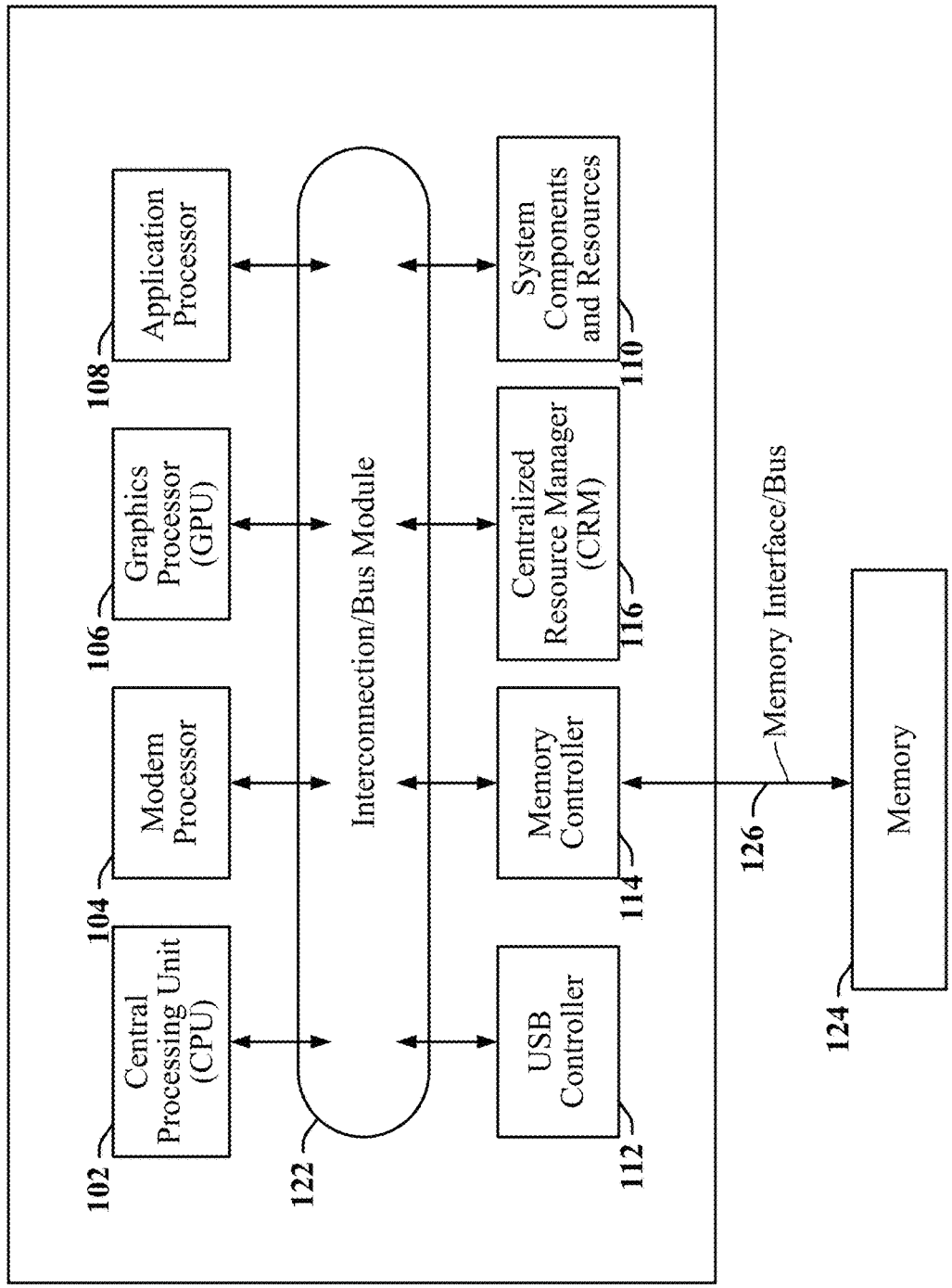
FIG. 1 illustrates an example of a system-on-a-chip (SOC) in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, netbooks, ultra-books, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred to as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

Certain aspects of the disclosure are applicable to circuits that generate, transmit, receive, process and/or propagate differential signals. A wire pair comprises two wires, connectors, interconnects or other conductors over which a differential signal is transmitted. The differential signal is carried in two phase versions over the wire pair, whereby the wires, connectors, interconnects or other conductors in the wire pair carry versions of the differential signal that are phase-shifted from each other by 180°. The versions of the differential signal transmitted over the wire pair may be referred to as complementary signals. The differential signal is transmitted over wires, connectors, interconnects or other conductors using voltages of equal voltage magnitude and opposite polarity. A received signal that represents the difference between the signaling state of the wire pair can be generated at a receiving device. An identical direct current (DC) offset from system ground carried by each wire of the pair may be referred to as a common-mode voltage. The common-mode voltage may be measured at the input terminals of a receiving device. An identical signal carried in-phase by each wire of the pair may be referred to as a common-mode signal. Common-mode noise affecting wires, connectors, interconnects or other conductors can be expected to induce a near-identical interference signal in the wire pair. The interference signal is typically cancelled by subtraction at the receiver and does not affect the received signal.

Certain aspects of this disclosure relate to calibration circuits used in interfaces that include high-speed serializer-deserializer (SerDes) circuits. Certain calibration circuits are described that can be deployed in the analog front-end (AFE) of a receiver. In one aspect, calibration techniques and circuits are disclosed. These calibration techniques and circuits may relate to components of an AFE gain stage, which may include equalizers such as a decision-feedback equalizer (DFE), a variable-gain amplifier (VGA), buffers, summers, and so on. In one example, some aspects of the disclosure relate to a circuit that includes a summer and a sampler.

FIG. 1 illustrates example components and interconnections in a system-on-chip (SoC) 100 that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from a memory 124 via a memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Figure 2:
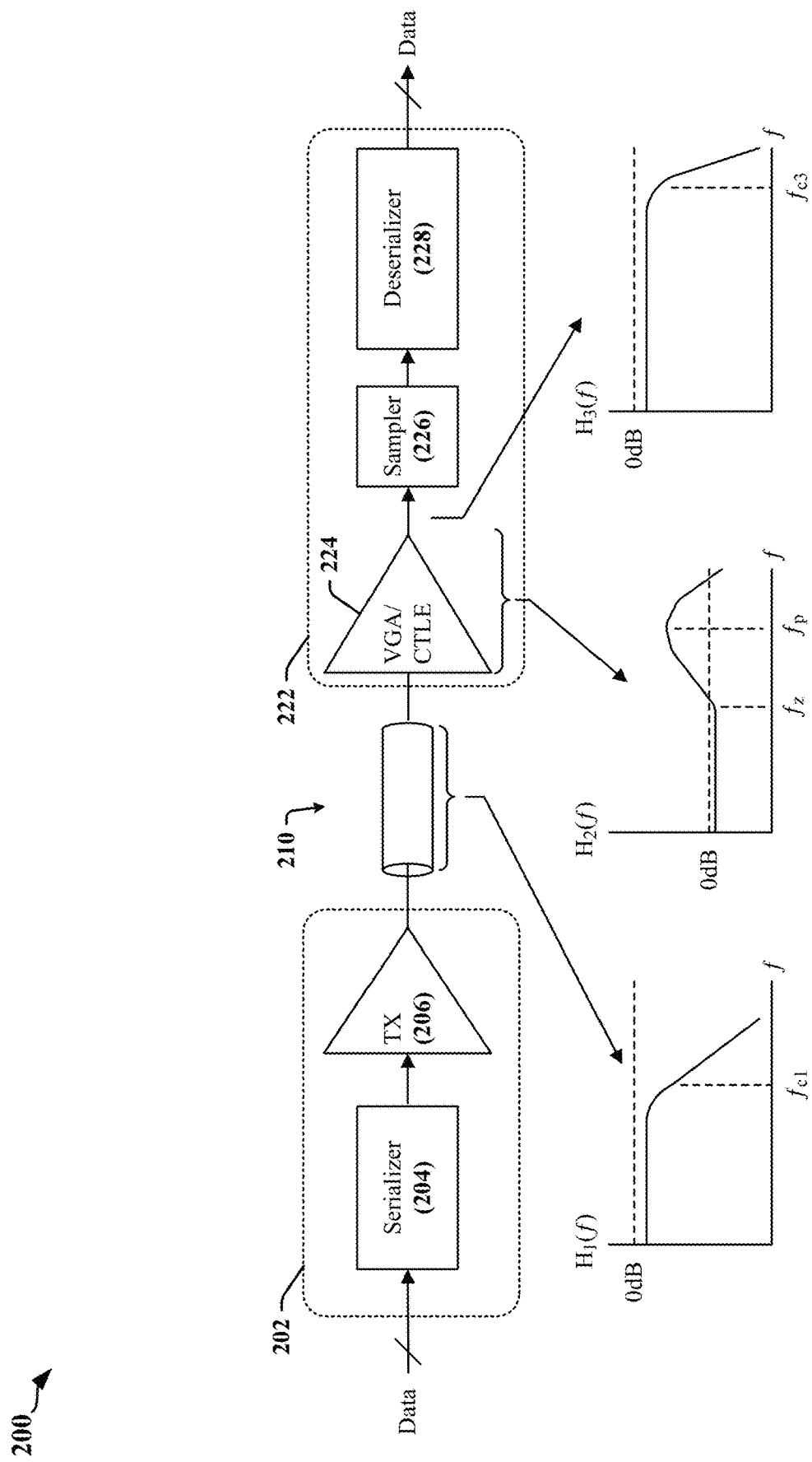
FIG. 2 illustrates an example of a data communication system that may be adapted in accordance with certain aspects of the present disclosure.

FIG. 2 illustrates an example of a data communication system 200 that may be adapted in accordance with certain aspects of the present disclosure. The data communication system 200 includes a transmitter 202, a data communication channel 210, and a receiver 222. The transmitter 202 may be provided in a first device that is configured to transmit a data signal to a second device. The data communication channel 210 provides a transmission medium through which the data signal propagates from the first device to the second device. The receiver 222 may be provided in the second device and may be configured to receive and process the data signal.

In one example, the transmitter 202 includes a serializer 204 configured to convert parallel data into serial data. The transmitter 202 further includes a transmit driver 206 configured to generate a data signal based on the serial data for transmission to the receiver 222 through the data communication channel 210.

The data communication channel 210 may be implemented using any type of transmission medium by which a data signal can propagate from the transmitter 202 to the receiver 222. Examples of the data communication channel 210 includes one or more metallization traces (which may include one or more vias) on a printed circuit board (PCB), stripline, microstrip, coaxial cable, twisted pair, etc.

In the illustrated example, the receiver 222 includes a VGA with a continuous time linear equalizer (CTLE), a clock data recovery circuit (the CDR 226) and a deserializer 228. The combination of the VGA and CTLE is referenced herein as the VGA/CTLE 224. CTLE may refer to techniques for boosting the higher frequency components of the signal at the receiver in order to bring all frequency components of the signal to a similar amplitude ratio before channel attenuation, improving jitter and eye-diagram performance. As disclosed herein, the VGA/CTLE 224 is configured to perform equalization and amplification of the received data signal. The CDR 226 is configured to recover a clock associated with the data signal and use the clock to recover the serial data from the data signal. The deserializer 228 is configured to convert the serial data back into parallel data.

The data communication channel 210 typically has a frequency response $H_1(f)$ that is similar to a low pass filter. For instance, the frequency response $H_1(f)$ has relatively low losses from direct current (DC) up to a particularly cutoff frequency $f_{c1}$; then the losses increase monotonically above the cutoff frequency $f_{c1}$. The frequency response $H_1(f)$ of the data communication channel 210 limits the data rate at which data may be sent through the channel. For example, the cutoff frequency $f_{c1}$ should be at least to the Nyquist rate of the data signal. If the Nyquist rate of the data signal is above the cutoff frequency $f_{c1}$, the data signal exhibits distortion at the receiver 222, which may be characterized as the eye in a signal eye diagram closing or getting smaller, making it difficult to recover the clock and the data by the CDR 226.

The VGA/CTLE 224 may perform equalization and amplification to increase the high frequency components of the data signal in order to increase the data rate at which the data signal may be sent through the data communication cable and reliably recovered at the receiver 222. For example, the VGA/CTLE 224 may be configured to provide a frequency response $H_2(f)$ that is substantially flat from DC up to a frequency $f_z$ corresponding to a Zero. Then, above the zero frequency $f_z$, the frequency response $H_2(f)$ of the VGA/CTLE 224 increases up to a frequency $f_p$ corresponding to a pole. Above the pole frequency $f_p$, the frequency response $H_2(f)$ of the VGA/CTLE 224 decreases monotonically. In some examples, the VGA/CTLE 224 may have more than one pole and one zero.

The VGA/CTLE 224 may be configured to have a frequency response $H_2(f)$ where the pole frequency $f_p$ substantially coincides with the cutoff frequency $f_{c1}$ of the frequency response $H_1(f)$ of the data communication channel 210. As the data communication channel 210 is cascaded with the VGA/CTLE 224, the frequency responses $H_1(f)$ and $H_2(f)$ of the data communication channel 210 and the VGA/CTLE 224 combine at the output of the VGA/CTLE 224 to form a composite frequency response $H_3(f)$. Thus, the high frequency boost at the pole frequency $f_p$ of the VGA/CTLE frequency response $H_2(f)$ compensates for the loss roll off at the cutoff frequency $f_{c1}$ of the channel frequency response $H_1(f)$ to generate the composite frequency response $H_3(f)$ having a cutoff frequency $f_{c3}$ much higher than the cutoff frequency $f_{c1}$ of the channel frequency response $H_1(f)$. Thus, through the use of the VGA/CTLE 224, much higher data rates between the transmitter 202 and receiver 222 may be realized.

Figure 3:
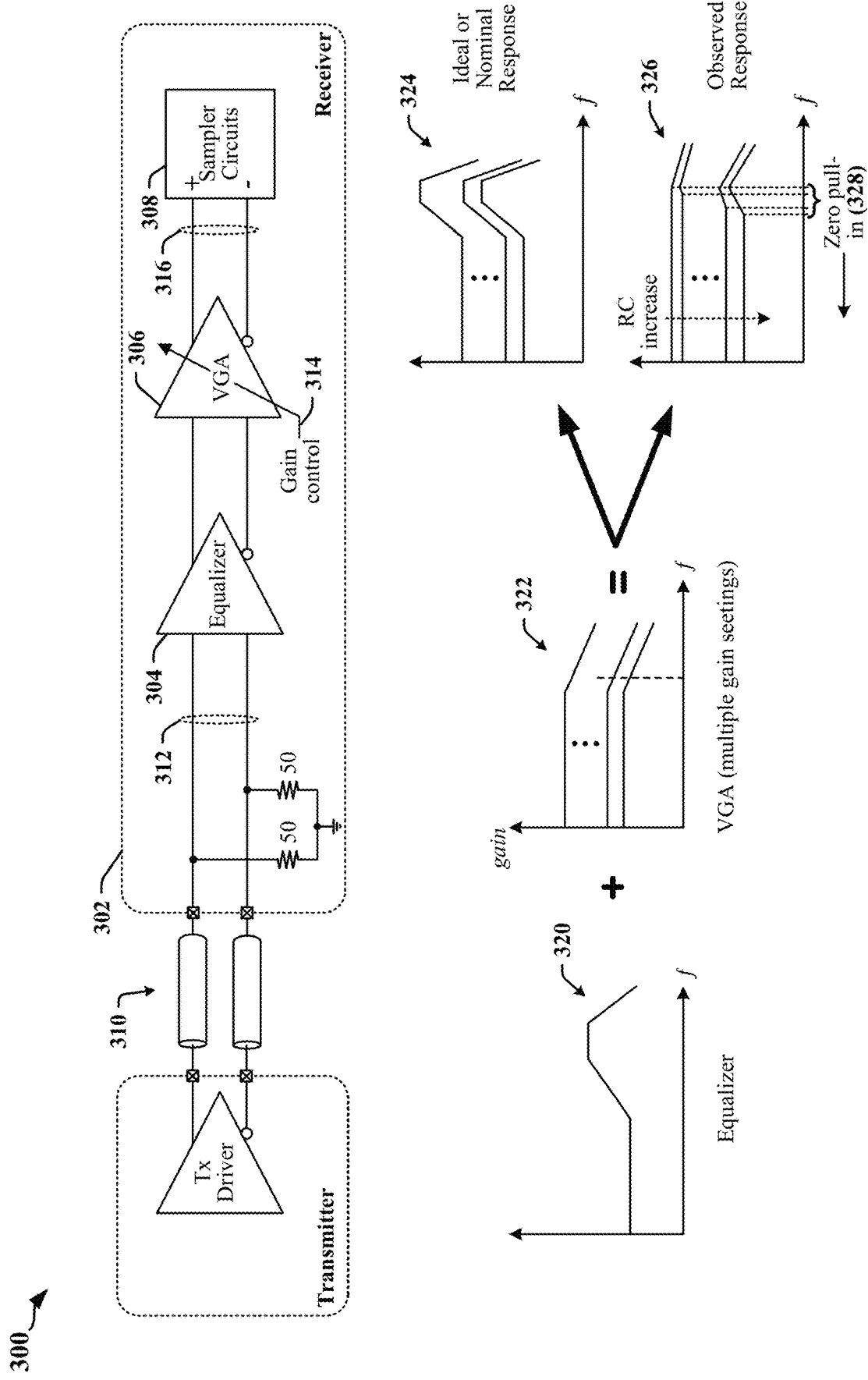
FIG. 3 illustrates certain aspects of the operation of a data communication interface that may be implemented in an SoC or in another IC device.

FIG. 3 illustrates certain effects of PVT variations affect the operation of transistors and other components in a data communication interface 300. The illustrated data communication interface 300 may be implemented in an SoC or in another IC device. The receiver 302 in the data communication interface 300 includes differential signal processing circuits, including an equalizer 304 and a variable gain amplifier (the VGA 306). The differential signal processing circuits can be configured to generate a differential output signal 316 by applying a frequency-dependent gain to a differential input signal 312, which is received from a differential communication channel 310 in the illustrated example. The differential output signal 316 may be provided to sampler circuits 308 configured to extract data and other information transmitted over the communication channel 310. In one example, the differential input signal 312 is applied to gate inputs or other control inputs of a pair of input transistors in the equalizer 304 and the output of the equalizer 304 is provided to the VGA 306. The gain of the VGA 306 is configurable through a gain control input 314. In one example, the gain control input 314 may include a 4-bit binary value that selects a gain setting from among 16 possible settings.

In the receiver 302, the VGA 306 cooperates with the equalizer 304 to equalize and amplify a small differential input signal 312 to a level that can be processed by a next stage. Ideally, the frequency response 320 of the equalizer 304 and the frequency response 322 of the VGA 306 produce an ideal combined frequency response 324 for each gain setting of the VGA 306. In the ideal situation the responses are substantially parallel for multiple gain settings in the combined frequency response 324. Parallel responses are indicative of consistent frequency response regardless of gain setting. A consistent equalization frequency response is typically desired regardless of the gain configured for the VGA 306. For example, the same equalization frequency response is typically desired for low amplitude signals and high amplitude signals, including when different gain settings are configured for the two signals.

In conventional systems, maintaining parallel responses for the different VGA gain settings can be very challenging. In many conventional systems, changes in VGA gain can affect equalizer pole/zero locations at high data rates. An observed combined frequency response 326 illustrates a loss of consistency between the different VGA gain settings that is indicated by a loss of parallelism at higher frequencies. In some instances, changes in the VGA 306 can affect the location of a parasitic-related Zero in the frequency response 326, in a manner referred to herein as "Zero pull-in" 328.

Certain aspects of this disclosure relate to the use of summer output calibration to optimize performance of a sampler in a high-frequency interface that includes a SerDes circuit. The example of a DFE is used herein to facilitate description of certain aspects of this disclosure. DFEs are nonlinear equalizer that are commonly used in serial links, including in high-speed SerDes circuits to flatten channel response and limit signal distortion. In certain examples, a DFE samples a received data signal to capture a time-series of bits that can be configured to cancel inter-symbol interference (ISI) in a current bit that is attributable to previous bits received in the received data signal. A summer and sampler may be provided in the DFE.

Figure 4:
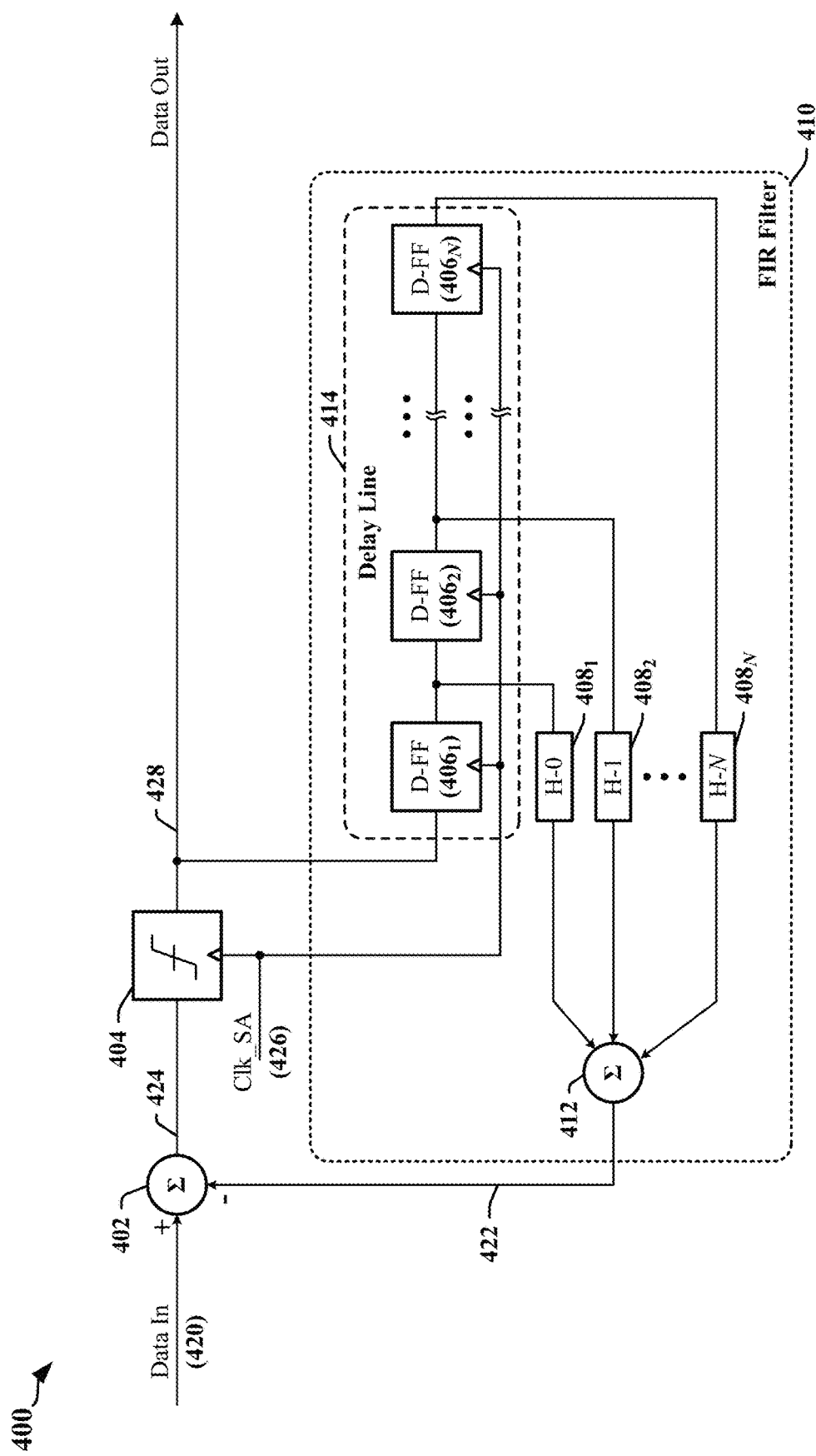
FIG. 4 illustrates a multi-tap decision-feedback equalizer that may be used in a data communication interface that can be adapted in accordance with certain aspects of this disclosure.

FIG. 4 provides an example of a conventional multi-tap DFE 400 that may be used in a data communication interface that can be adapted in accordance with certain aspects of this disclosure. For example, the presently disclosed calibration techniques and circuits can accommodate or compensate for the effects of manufacturing process, voltage and/or temperature (PVT) variations on a sampler 404 and/or current summers 402, 412 provided within the DFE 400.

The current summer 402 may be configured to sum an input data signal 420 received from a communication link and a feedback signal 422 provided by a finite input response (FIR) filter 410. The output 424 of the current summer 402 is provided to a sampler 404, which may be implemented using a flipflop or latch that is clocked by a sampling clock signal (the CLK_SA signal 426), which may be derived from a clock signal corresponding to the input data signal 420. The CLK_SA signal 426 may be configured to capture data from a serial bus, for example. The sampler 404 may be referred to as a slicer that produces a sliced data signal 428 to an input to the FIR filter 410.

The illustrated FIR filter 410 includes a delay line 414 that can maintain the signaling state of the input data signal 420 in a number of previous transmission intervals. In one example, signaling state may be represented by a binary bit. In other examples, signaling state may be represented by a multibit binary number. In some examples, signaling state of a multibit input signal may be represented by a symbol. The output of the sampler 404 represents the current symbol value or signaling state of the channel in the current transmission interval. The current transmission interval may be referred to as the cursor. Outputs of the delay line 414 maintain representations of symbol value or signaling state of the channel in one or more post-cursor transmission intervals and may be used to cancel reflections and other post-cursor ISI affecting the channel in the current transmission interval. Weighted versions of the outputs of the delay line 414 may be used to subtract post-cursor ISI from the input data signal 420.

In the illustrated example, the sliced data signal 428 is used to drive the delay line 414. The delay line includes a number (N) of D-flipflops (D-FFs $406_1$-$406_N$) clocked by the CLK_SA signal 426. Weight values can be applied to the outputs of the D-FFs $406_1$-$406_N$. In the illustrated example, configurable weighted tap coefficients $408_0$-$408_N$ are applied to the outputs of the D-FFs $406_1$-$406_N$ in a feedback path that includes a current summer 412 that adds the weighted prior decisions to produce the feedback signal 422. In some implementations, current summer 402 may be used to sum the input data signal 420 and the weighted prior decisions.

In the illustrated example, the feedback signal 422 provides negative feedback. Magnitudes and polarities of the weighted tap coefficients $408_0$-$408_N$ can be configured, calibrated or adjusted to compensate for channel characteristics. The multi-tap DFE 400 can be configured to cancel ISI attributable to previous bits received in the input data signal 420, enabling later-received bits to be sampled or detected by the sampler 404 with reduced bit error rate (BER). In some instances, the weighted tap coefficients $408_0$-$408_N$ can be preconfigured by a designer or application. A controller may determine the value of the weights based on preconfigured information or information obtained from calibration or training. In some instances, the configuration, calibration, training or adjustment of the weighted tap coefficients $408_0$-$408_N$ can be performed using an adaptive algorithm. In some implementations, the weighted tap coefficients $408_0$-$408_N$ are applied to control current levels using a current digital-to-analog converter (IDAC) and/or a bias control circuit. The multi-tap DFE 400 is presented solely for the purpose of providing one example of the use of summers and samplers. Other types of circuit may include summers and samplers to perform functions other than DFE-related functions.

Figure 5:
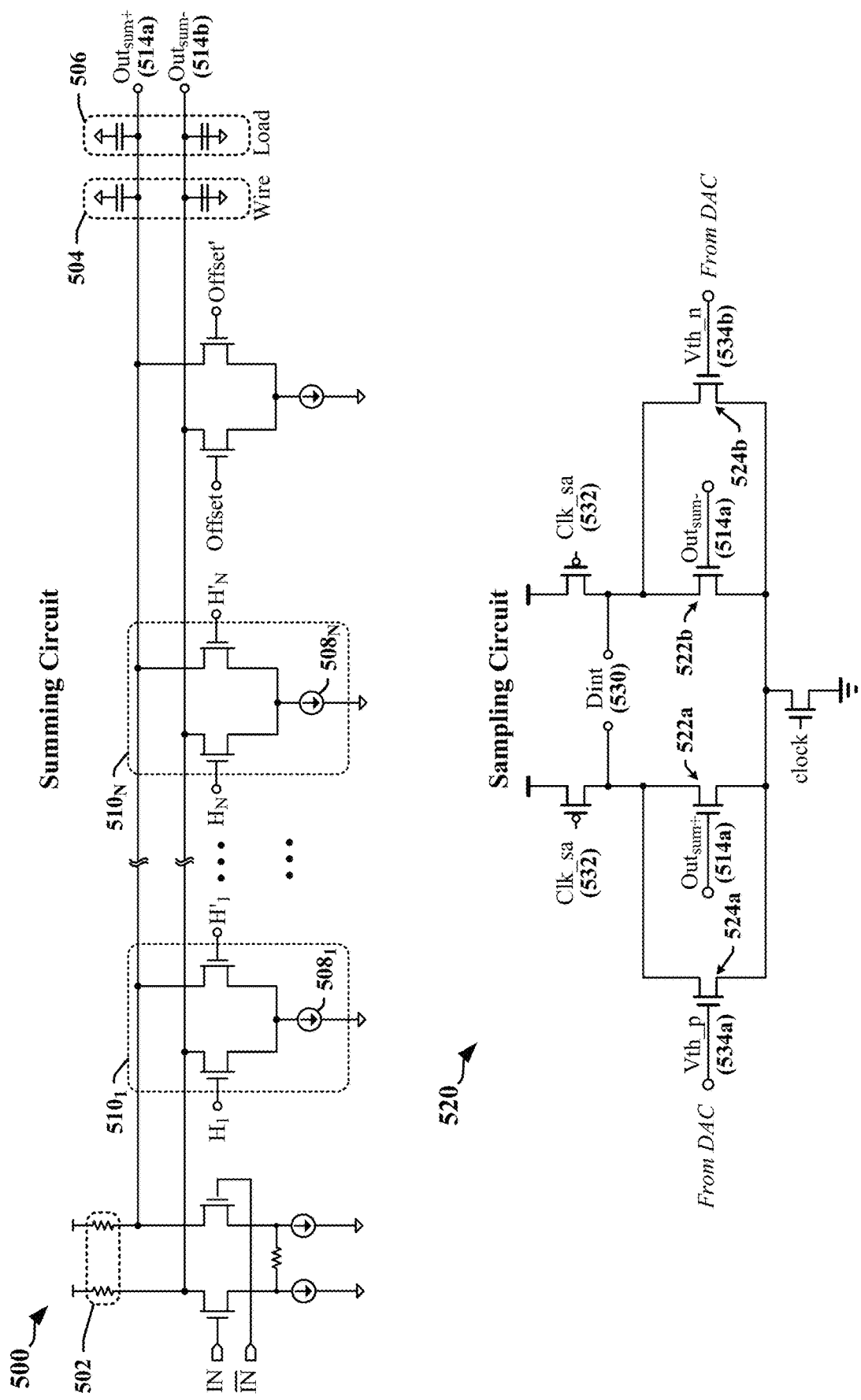
FIG. 5 illustrates an example of a current summer and a sampling circuit that may be used in a conventional multi-tap decision-feedback equalizer.

FIG. 5 illustrates examples of a current summer 500 and a sampling circuit 520 that may be used in a conventional DFE. The current summer 500 is a resistive-load summer in which multiple currents are summed with an offset current to produce a combined current (I) that flows through a load provided by resistances 502. The resistances may be implemented using suitably biased transistors. The product of the combined current and the resistance (IR) determine the differential voltage at the output (i.e., the voltage difference between $Out_{sum+}$ 514a and $Out_{sum-}$ 514b). The resistance (R) provided by the resistances 502, combined with wire capacitances 504 and load capacitances 506 (collectively, "C"), can impact the settling time of transitions in data signals due to the resultant RC time constant. The resistance value of the resistances 502 can determine the swing time of the output of the current summer 500. The current summer 500 includes current sources $508_1$-$508_N$ that provide DC bias current for each of the N taps $510_1$-$510_N$. The current provided by each of the N taps $510_1$-$510_N$ is configured by corresponding differential weighting signals, including the differential pair $H_1$ and $H'_1$ in the weighting signal provided to the first tap $510_1$ and the differential pair $H_N$ and $H'_N$ in the weighting signal provided to the $N^{th}$ tap $510_N$.

The sampling circuit 520 may be enabled when Clk_sa 532 transitions to the high signaling state. The gates of input transistors 522a, 522b receive a differential input signal received from a summing circuit. The input transistors 522a, 522b drive a differential output (Dint 530). In the illustrated example, the differential input signal is provided by the current summer 500. The gate of a first input transistor 522a is coupled to the $Out_{sum+}$ 514a and the gate of a second input transistor 522b is coupled to the complementary $Out_{sum-}$ 514b.

In the illustrated example, a pair of reference transistors 524a, 524b coupled in parallel with the input transistors 522a, 522b applies the threshold voltage that enables the sampling circuit 520 to determine the signaling state of the differential input signal. The gates of the reference transistors 524a, 524b receive a differential threshold signal. The gate of a first reference transistor 524a is coupled to a $V_{th+}$ signal 534a and the gate of a second reference transistor 524b is coupled to the complementary $V_{th-}$ signal 534b. In one example, the differential threshold signal may be provided by a digital-to-analog converter (DAC). The drain of a first reference transistor 524a is coupled in parallel with the drain of the first input transistor 522a such that the first reference transistor 524a determines the gate voltage at which the first input transistor 522a switches between on and off states. The drain of a second reference transistor 524b is coupled in parallel with the drain of the second input transistor 522b such that the second reference transistor 524b determines the gate voltage at which the second input transistor 522b switches between on and off states.

Figure 6:
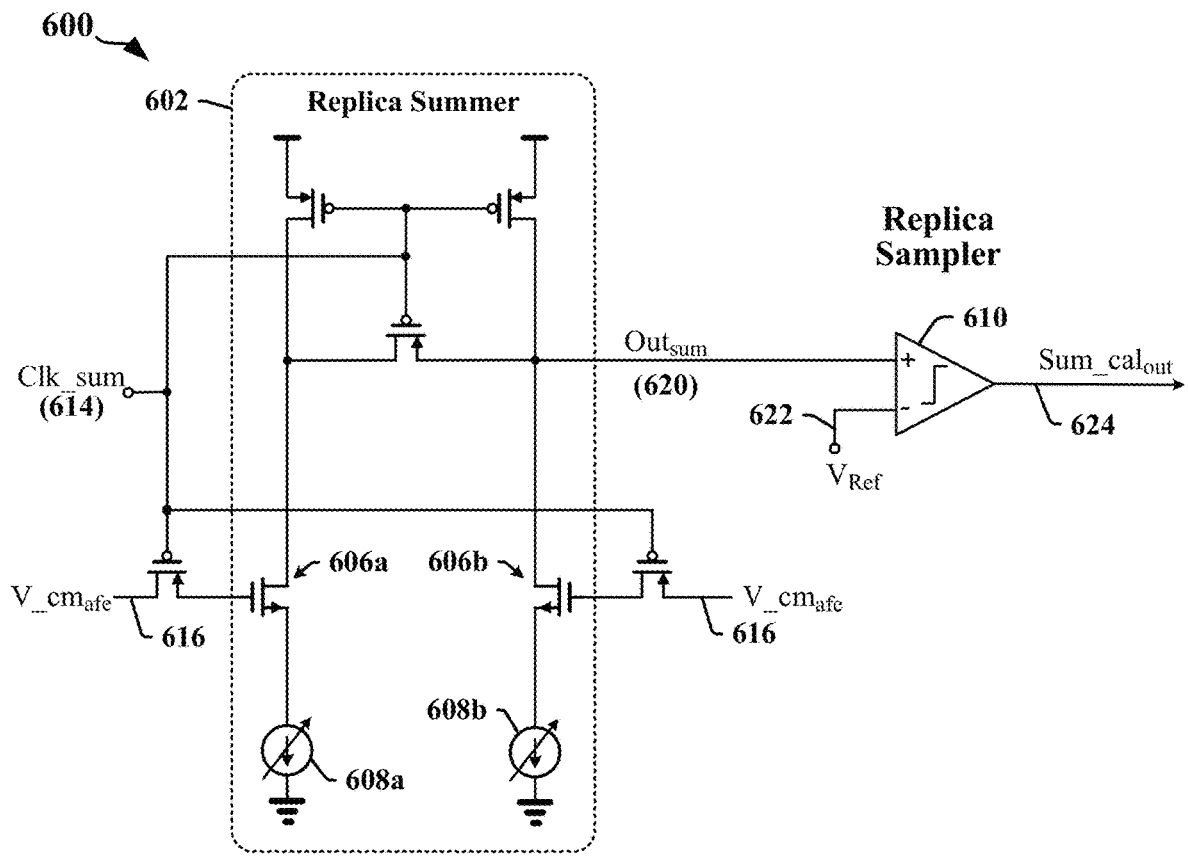
FIG. 6 illustrates a calibration circuit that may be adapted or reconfigured in accordance with certain aspects of this disclosure.
Figure 6:

FIG. 6 illustrates a calibration circuit 600 in a high-speed interface that includes a replica summing circuit 602 and replica sampling circuit 610 that may be adapted or reconfigured in accordance with certain aspects of this disclosure. The illustrated replica summing circuit 602 and the replica sampling circuit 610 are replica circuits that may be used to determine operating parameters in an interface. A sampler is typically highly sensitive to changes in the common-mode (CM) voltage of its input. CM voltage can affect sensitivity of the sampler and can increase or decrease delays between the input and an output of the sampler in a manner that impedes calibration. CM voltage can be dependent on data rate through the sampler. For example, in some implementations the sampler is expected to operate at data rates that range between 2.5 gigabits per second (Gbps) and 32 Gbps. CM voltage is also dependent of PVT corners. PVT corners may refer to operating points, parameters and/or conditions that are defined by manufacturing tolerances (process corners) and by different voltage or temperature limits defined for circuits included in the SerDes interface.

Conventional samplers use an external reference voltage ($V_{Ref}$ 622) that is defined based on the CM voltage of the input to the sampler 404 in FIG. 4. $V_{Ref}$ 622 is typically a direct current (DC) voltage output by a DAC. The DAC may be defined by bits of an external register, such as a configuration and status register (CSR). The CSR may be configured during system initialization and/or calibration and variations in operating data rate, PVT and other conditions may require recalibration to maintain optimized operation. Optimized operation may relate to limits on sensitivity and delays specified for the sampler. The illustrated calibration circuit 600 produces an output signal (the $Sum\_cal_{out}$ signal 624) that can be used to configure the replica summing circuit 602 and/or corresponding summing circuits in the interface in order to accommodate the CM voltage level ($V\_cm_{afe}$ 616) at the input of the interface.

In the illustrated example, the replica summing circuit 602 is effectively a replica of a summing circuit in the summer 412 illustrated in FIG. 4. The summer 412 includes at least N summing circuits to sum the contributions of the N taps in the FIR filter 410. The circuit structure and or signaling paths provided in the replica summing circuit 602 are nominally identical to corresponding structures and or signaling paths in the summing circuits of the summer 412. The replica summing circuit 602 is clocked by a summer enable signal (the Clk_sum signal 614) that is used to control timing of sampling. In the illustrated example, the replica summing circuit 602 is enabled when the Clk_sum signal 614 is in a first signaling state, which may be referred to as the high signaling state, and the replica summing circuit 602 is disabled when the Clk_sum signal 614 is in a second signaling state, which may be referred to as the low signaling state. The gates of input transistors 606a, 606b are coupled to $V\_cm_{afe}$ 616 when the Clk_sum signal 614 is in the high signaling state. The sources of the input transistors 606a, 606b are coupled to respective current sources 608a, 608b that may be configured during calibration to provide a desired, determined or specified current in the replica summing circuit 602. Changes in the current in the replica summing circuit 602 may be reflected in the gain of the summing circuits in the summer 412, which may be configured to define the weighted tap coefficients $408_0$-$408_N$. In some examples, the current in the replica summing circuit 602 controls the rate of change of voltage of an output of the replica summing circuit 602. The voltage of the output of the replica summing circuit 602 may be defined by, or expressed as an integral of the current flowing in the replica summing circuit 602 over a period of time. In one example, the period of time may correspond to a fraction of the period of the Clk_sum signal 614.

The drain of each of the input transistors 606a, 606b is coupled to an output ($Out_{sum}$ 620) of the replica summing circuit 602. $Out_{sum}$ 620 is provided to a first input of the replica sampling circuit 610, which is configured to compare the voltage at the first input to $V_{Ref}$ 622. The output of the replica sampling circuit 610 drives the $Sum\_cal_{out}$ signal 624.

In one example, the replica sampling circuit 610 is enabled when a sampling clock signal (the Clk_SA signal 612) is in the first signaling state. $Out_{sum}$ 620 is provided to the gate of a first input transistor 632 in the replica sampling circuit 610, and $V_{Ref}$ 622 is coupled to the gate of a second input transistor 634. The differential output (Dint 630) of the replica sampling circuit 610 represents the difference between $Out_{sum}$ 620 and $V_{Ref}$ 622.

Figure 7:
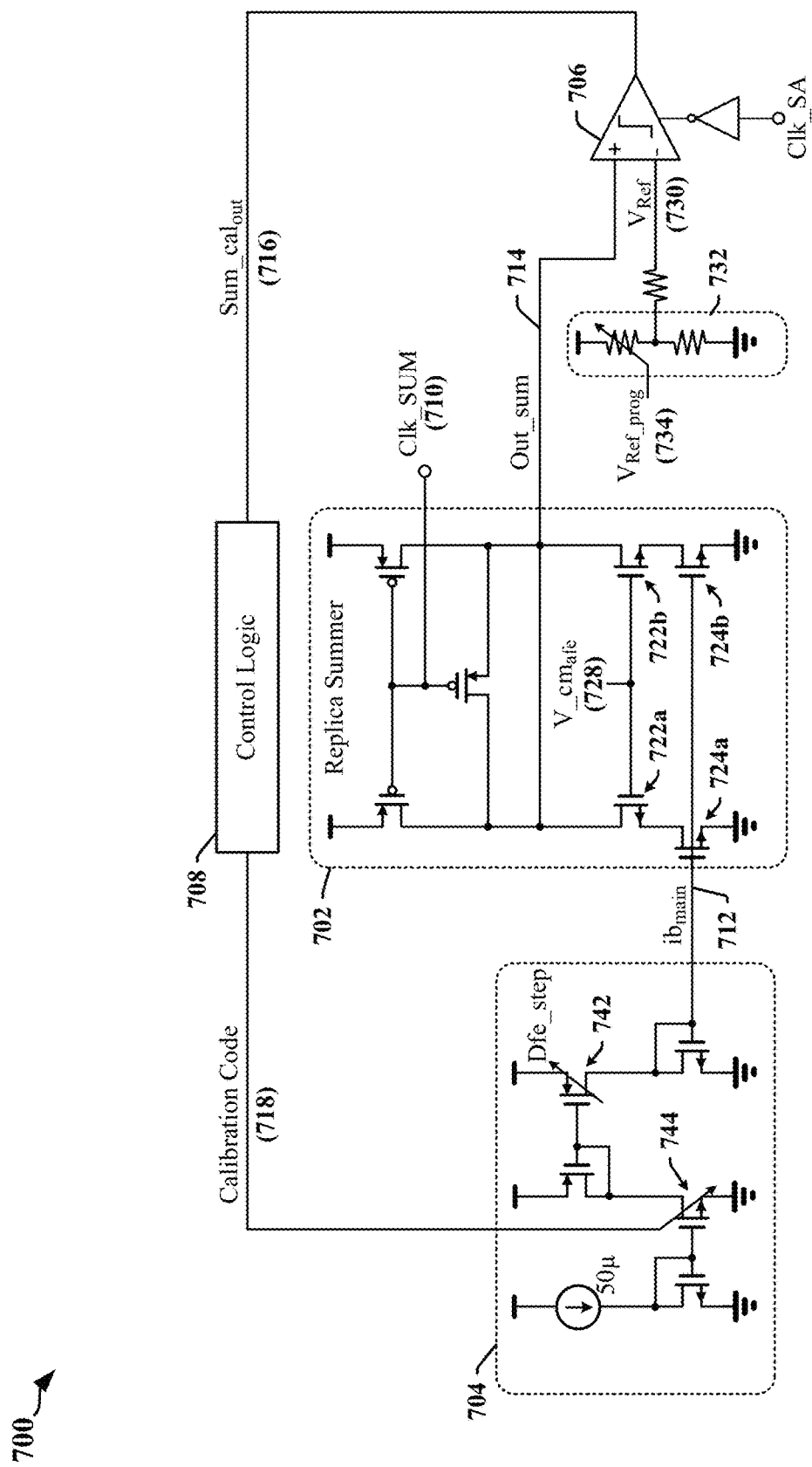
FIG. 7 illustrates an example of a calibration circuit that may be used to adjust the common mode voltage in accordance with certain aspects of this disclosure.

FIG. 7 illustrates an example of a calibration circuit 700 that may be used to adjust the common mode voltage in a signal provided to a sampler in an interface circuit. In the illustrated example, the sampler in the interface circuit receives a reference voltage signal ($V_{Ref}$ 730) from a programmable resistor divider 732. The voltage of $V_{Ref}$ 730 may be adjusted or configured using a multibit control code (the $V_{Ref\_prog}$ 734). In other examples, $V_{Ref}$ 730 is provided by a DAC. $V_{Ref\_prog}$ 734 may be configured during system initialization and/or calibration.

The calibration circuit 700 includes a replica sampling circuit 706 and a replica summing circuit 702. The illustrated replica summing circuit 702 and the replica sampling circuit 710 are replica circuits that may be used to determine operating parameters in an interface and/or to respond to the operating parameters in the same manner as corresponding samplers and summers in the interface circuit. The calibration circuit 700 may be configured to compensate for changes in the CM voltage in the signal provided to the sampler in the interface circuit. Changes in CM voltage can affect sensitivity and delays between the input and an output of a previously calibrated sampler. CM voltage can vary with data rate through the sampler, which may range between 2.5 Gbps and 32 Gbps. CM voltage can change in response to PVT variations.

The illustrated calibration circuit 700 produces a calibration signal (the $Sum\_cal_{out}$ signal 716) that can be used to adjust the current provided in the replica summing circuit 702 and/or corresponding summing circuits in the interface circuit in order to accommodate changes in the CM voltage level ($V\_cm_{afe}$ 728) at an input of an analog front-end (AFE) subcircuit in the interface circuit.

In the illustrated example, the replica summing circuit 702 is effectively a replica of a summing circuit in the summer 412 illustrated in FIG. 4. The summer 412 includes at least N summing circuits to sum the contributions of the N taps in the FIR filter 410. The circuit structure and or signaling paths provided in the replica summing circuit 702 are nominally identical to corresponding structures and or signaling paths in the summing circuits of the summer 412. The replica summing circuit 702 is clocked by a summer enable signal (the Clk_sum signal 710) that is used to control timing of sampling. In the illustrated example, the replica summing circuit 702 is enabled when the Clk_sum signal 710 is in a first signaling state, which may be referred to as the high signaling state, and the replica summing circuit 702 is disabled when the Clk_sum signal 710 is in a second signaling state, which may be referred to as the low signaling state. The gates of input transistors 722a, 722b are coupled to $V\_cm_{afe}$ 728. The sources of the input transistors 722a, 722b are coupled to respective transistors 724a, 724b that control the current provided in the replica summing circuit 702. The current provided in the replica summing circuit 702 may be determined by a bias voltage ($ib_{main}$ 712) that is controlled or configured by a feedback loop of the calibration circuit 700.

The replica summing circuit 702 provides an output (Out_sum 714) that is representative of $V\_cm_{afe}$ 728. The voltage level of Out_sum 714 may increase over a period of time defined by the Clk_sum signal 710. The increase in voltage level of Out_sum 714 may be expressed as an integral of the current provided in the replica summing circuit 702 over a period of time defined by the Clk_sum signal 710. Out_sum 714 is provided to one input of the replica sampling circuit 706 which outputs the $Sum\_cal_{out}$ signal 716. The $Sum\_cal_{out}$ signal 716 represents the difference between Out_sum 714 and $V_{Ref}$ 730. The $Sum\_cal_{out}$ signal 716 is provided to loop control circuit 708 that can determine whether the difference between Out_sum 714 and $V_{Ref}$ 730 requires an adjustment of $ib_{main}$ 712. In some implementations, the loop control circuit 708 is implemented using a processing circuit that includes a processor, controller, sequencer, signal processor or general-purpose processor. The processing circuit may implement a state machine. In some implementations, the loop control circuit 708 is implemented using combinational logic responsive to information provided in the $Sum\_cal_{out}$ signal 716. In some implementations, the loop control circuit 708 may increment or decrement a calibration code 718 provided to a current source control circuit 704 based on the sign (+ or −) of the difference between Out_sum 714 and $V_{Ref}$ 730. In some implementations, the loop control circuit 708 may determine a value for the calibration code 718 based on the difference between Out_sum 714 and $V_{Ref}$ 730 and a previous value configured for the calibration code 718.

The calibration code 718 may be used to configure an operating point of a variable transistor 744 or array of transistors. In one example, the calibration code 718 selects a number of transistors to be coupled in parallel to provide variable transistor 744. The number of transistors may determine the current flow through variable transistor 744 and thereby determine voltage at the gate of variable transistor 742. The voltage at the drain of variable transistor 742 defines $ib_{main}$ 712. The voltage at the drain of variable transistor 742 is determined in part by its gate voltage and by the current flowing through its drain, which is in turn determined by the number of transistors coupled in parallel to provide variable transistor 742. In one example, the number of transistors coupled in parallel to provide variable transistor 742 may be selected to provide a desired tap coefficient (cf. the multi-tap DFE 400 illustrated in FIG. 4). The tap coefficient may be defined by a DFE step code provided by a controller in the interface circuit. In some implementations, the tap coefficient is defined by the loop control circuit 708.

The calibration methodology illustrated by the calibration circuit 700 suffers from certain drawbacks. For example, the calibration methodology relies on calibration of external components such as a programmable resistor divider 732 or a DAC. These external components are fixed and do not automatically follow or respond to changes input CM voltage. Recalibration of the external components may be required to accommodate variations in input CM voltage caused by data rate and PVT variations.

Figure 8:
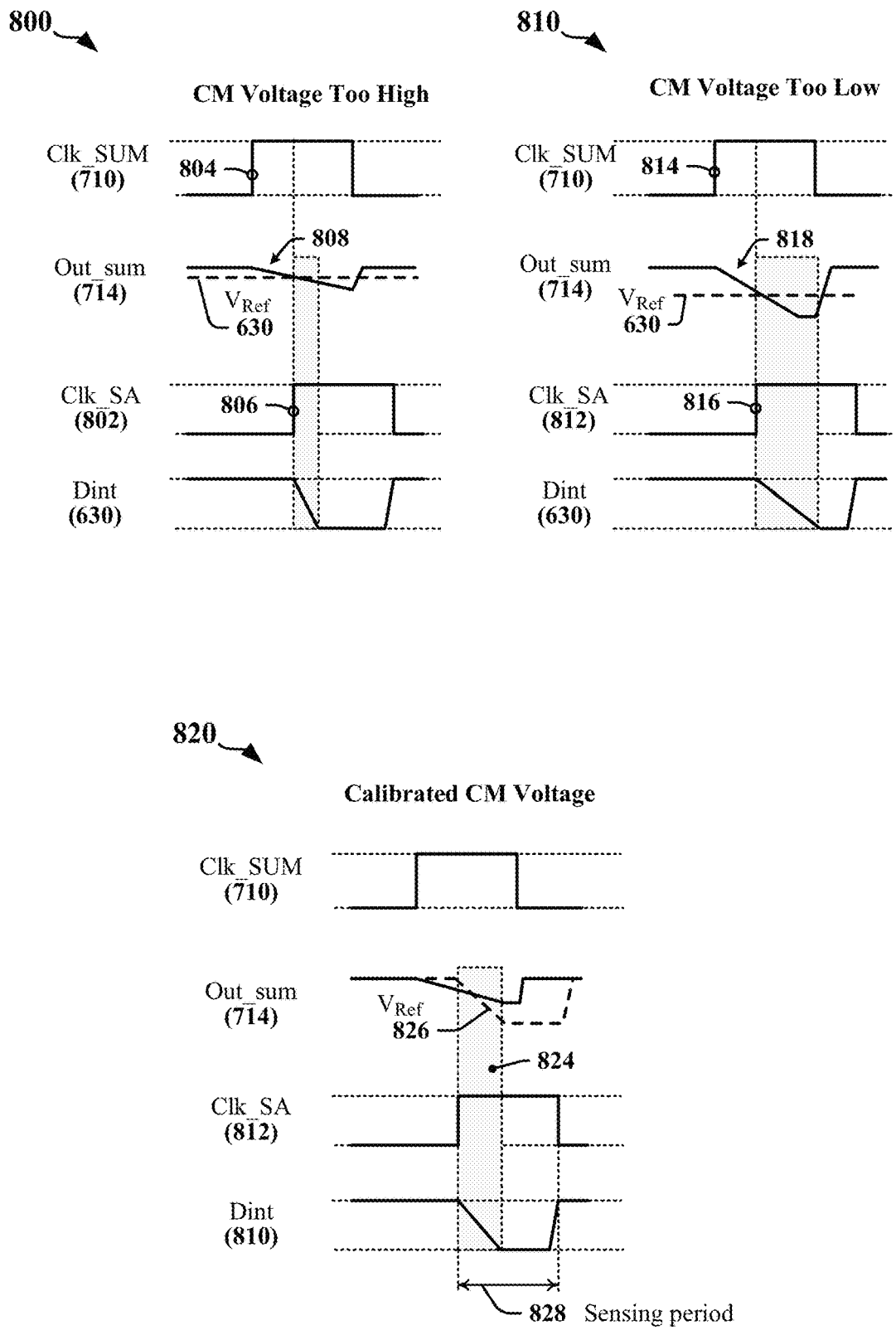
FIG. 8 includes illustrates certain effects of common mode voltage during calibration of a summer using the calibration circuit of FIG. 7.

FIG. 8 includes timing diagrams 800, 810 that illustrates certain effects of CM voltage levels during calibration of a summer in an interface circuit using the calibration circuit 700 of FIG. 7. For the purposes of descriptions regarding the timing diagrams 800, 810, the replica sampling circuit 706 is assumed to be implemented using the replica sampling circuit 610 illustrated in FIG. 6. The output of the replica summing circuit 702 (i.e., Out_sum 714) begins to fall at transitions 804, 814 of Clk_SUM 710 to the high signaling state. The rate at which Out_sum 714 falls depends on the current supplied by the current sources 608a, 608b. The voltage of Out_sum 714 may be expressed as an integral of the current supplied by the current sources 608a, 608b. The replica sampling circuit 706 is enabled when Clk_SA 802, 812 transitions 806, 816 to the high signaling state.

In the first timing diagram 800, CM voltage at the input of the interface circuit is sufficiently high that the output of the sampler decreases rapidly 808. The rapid decrease in output of the sampler can cause one or more of the transistors 632, 634 in the replica sampling circuit 610 to leave saturation mode and enter triode mode, thereby limiting or degrading sensitivity of the replica sampling circuit 610. The saturation mode of a transistor corresponds to an operating region defined by a substantially linear relationship between drain current and gate-source voltage ($V_{GS}$). In the triode region, which may also be referred to as the ohmic region, drain current can vary with drain-source voltage ($V_{DS}$) for a fixed $V_{GS}$. In the second timing diagram 810, CM voltage at the input of the interface circuit is sufficiently low that the output of the sampler decreases slowly 818 and degrades timing of the sampler and can limit the data rate achievable by the interface.

Figure 9:
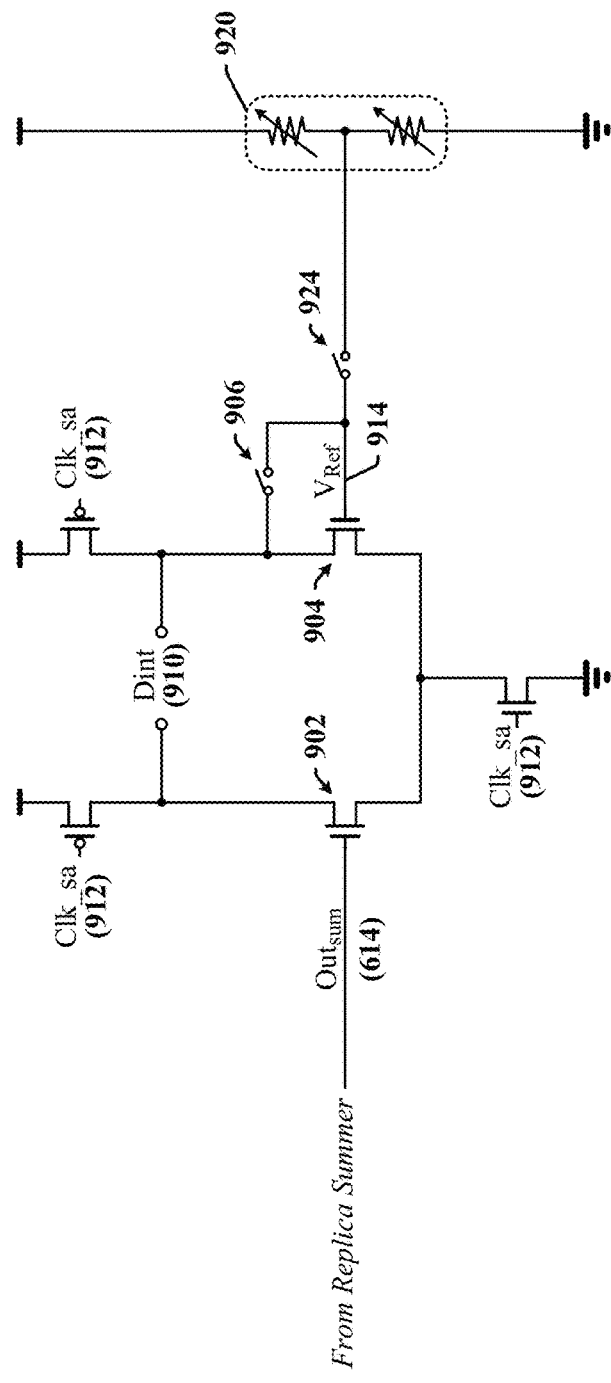
FIG. 9 illustrates an example of a replica sampling circuit that is configured and operated in accordance with certain aspects of this disclosure.

FIG. 8 includes a third timing diagram 820 that corresponds to a calibration circuit that is configured and operated in accordance with certain aspects of this disclosure. FIG. 9 illustrates an example of a replica sampling circuit 900 that is configured and operated in accordance with certain aspects of this disclosure. In one example, the replica sampling circuit 900 may be used to implement the replica sampling circuit 706 and programmable resistor divider 732 in the calibration circuit 700 illustrated in FIG. 7. The replica sampling circuit 900 may be used to determine operating parameters in an interface. In one example, the replica sampling circuit 900 is used during calibration of the replica summing circuit 702 illustrated in FIG. 7.

The illustrated replica sampling circuit 900 may be configured to moderate or eliminate the effect of changes in the common-mode (CM) voltage of its input and to optimize sensitivity of the replica sampling circuit 900 and the duration of delays between the input and an output of the sampler. CM voltage can be dependent on data rate through the sampler and PVT variations.

In one aspect, the replica sampling circuit 900 may operate without an external voltage reference generated by a DAC or resistor network. However, certain implementations may provide an option to use external voltage references. In the illustrated example, the replica sampling circuit 900 includes a switch 924 that, when closed, enables an external source to provide the voltage reference ($V_{Ref}$ 914) used by the replica sampling circuit 900. In the illustrated example, the external source for a reference voltage is implemented as a programmable resistor divider 920. In other examples, the external source may be implemented using a DAC. The switch 924 may be included to support certain legacy modes of operation, for example.

The replica sampling circuit 900 is enabled when Clk_SA 912 transitions to the high signaling state. The gate of a first input transistor 902 of the replica sampling circuit 900 is coupled to the output of a replica summing circuit. In the illustrated example, the gate of a first input transistor 902 is coupled to Out_sum 714 provided by the replica summing circuit 702 illustrated in FIG. 7. The replica sampling circuit 900 can operate without an external voltage reference by causing a second input transistor 904 to be diode connected. The second input transistor 904 may be diode connected when the gate and the drain of the second input transistor 904 are coupled. In the illustrated example, the gate and the drain of the second input transistor 904 are selectively coupled through a switch 906 that may be opened during legacy mode calibrations that use an external reference voltage source. When the switch 906 is closed or activated, $V_{GS}=V_{DS}$ for the second input transistor 904. A diode connected transistor operates in saturation mode when its associated power supply is provided within a specified operating voltage range. The second input transistor 904 is expected to operate in saturation mode regardless of CM voltage level. Accordingly, a summer output can be calibrated to an optimal voltage level for all PVT corners and all expected or specified data rates. An optimal voltage level for the summer output can be expected to maintain the sampler circuits and transistors in saturation during sensing period 828 and can ensure that the sampler performs at the optimal level in terms of sensitivity and input-to-output delay.

Referring again to the third timing diagram 820 in FIG. 8, the elimination of a fixed reference voltage provides a sampling window 824 that has a uniform duration. $V_{GS}$ is serves as an internally generated variable reference voltage for the replica sampling circuit 900. The sampling window 824 corresponds to the duration of the transition 826 of $V_{GS}$ (and of $V_{DS}$). The output (Dint 910) of the replica sampling circuit 900 that is provided to loop control circuit 708 is optimized for sensitivity and input-to-output delay with respect to the output (Dint 630) of the conventional replica sampling circuit 610 (see FIGS. 6 and 8).

A calibration circuit provided in accordance with certain aspects of this disclosure includes a replica summer and replica sampling circuit. In one example, the replica summer corresponds to the replica summing circuit 702 illustrated in FIG. 7 and the replica sampling circuit corresponds to the replica sampling circuit 900 illustrated in FIG. 9. The replica summer may include a pair of summing input transistors, which may correspond to the input transistors 722a, 722b illustrated in FIG. 7. Each summing input transistor may have a gate that is configured to receive an input signal representative of a common mode voltage of an input to an analog front-end circuit. Each summing input transistor may have a drain that is coupled to a summer output signal. Each summing input transistor may have a source that is coupled to at least one summer source transistor that is configured to control currents flowing in the pair of summing input transistors. In one example, a pair of summer source transistors may be provided, such as the transistors 724a, 724b that control the current provided in the replica summing circuit 702.

The replica sampling circuit may have a pair of sampling input transistors, which may correspond to the input transistors 902, 904 illustrated in FIG. 9. The of sampling input transistors may include a first sampling input transistor that has a gate configured to receive the summer output signal. The source of the first sampling input transistor may be coupled to a sampling source transistor that controls currents flowing in each of the sampling input transistors. The drain of the first sampling input transistor may be coupled to a first feedback signal. A second sampling input transistor may be a diode connected transistor. The drain and gate of the second sampling input transistor may be coupled to a second feedback signal. The first feedback signal and second feedback signal may be complementary signals of a differential feedback signal.

In certain implementations, the differential feedback signal is provided as a differential input to a current source control circuit. The current source control circuit may have a control output that is coupled to a gate of the at least one summer source transistor. The current source control circuit may include a current source that is configured using a calibration code. The current source control circuit may include a current source that is configured based on a tap coefficient defined for a decision-feedback equalizer.

In certain implementations, the replica summing circuit is a partial replica of a current summer in a SerDes interface, although it is contemplated that the replica summing circuit may fully replicate the structure of the current summer in the SerDes interface. The replica sampling circuit may be a partial replica of a sampler in the SerDes interface, although it is contemplated that the sampling circuit may fully replicate the structure of the sampler in the SerDes interface. In some implementations, the same level of current flows in the pair of summing input transistors and a corresponding pair of transistors in the current summer of the SerDes interface.

Examples of Processing Circuits and Methods

Figure 10:
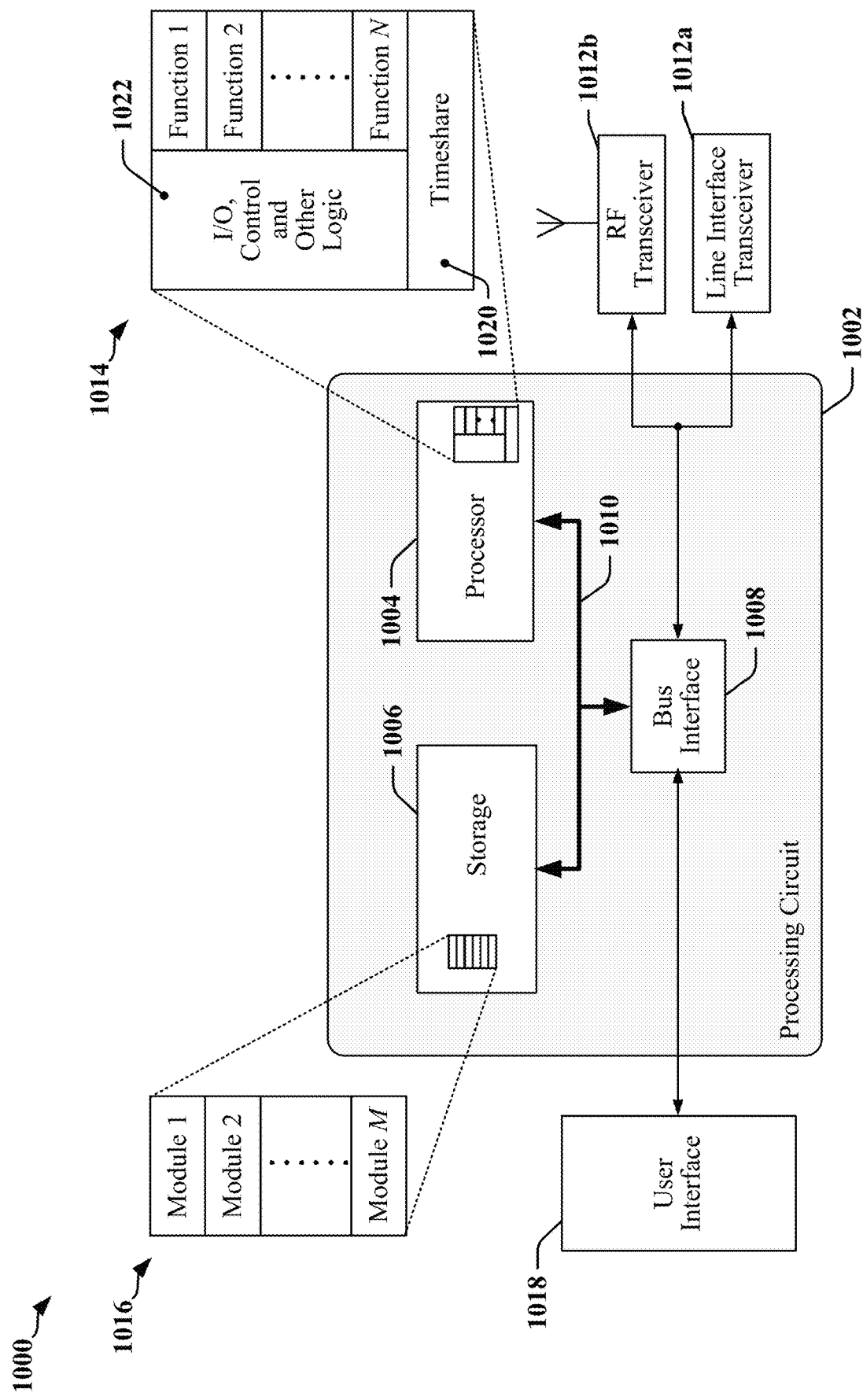
FIG. 10 illustrates one example of an apparatus employing a processing circuit that may be adapted according to certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012a, 1012b. A transceiver 1012a, 1012b may be provided for each networking technology supported by the processing circuit. In some instances, multiple networking technologies may share some or all of the circuitry or processing modules found in a transceiver 1012a, 1012b. Each transceiver 1012a, 1012b provides a means for communicating with various other apparatus over a transmission medium. In one example, a transceiver 1012a may be used to couple the apparatus 1000 to a multi-wire bus. In another example, a transceiver 1012b may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement certain methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012*a*, 1012*b*, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012*a*, 1012*b*, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012*a*, 1012*b*, and device drivers, for example. To support the performance of multiple functions, the one or more processors 1004 may be configured to provide a multitasking environment, whereby each of a plurality of functions is implemented as a set of tasks in a corresponding context that is serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit operates in a corresponding context and is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

In one example, the processing circuit 1002 may be used to implement a calibration circuit or perform some function related to the calibration circuit. The calibration circuit may include a replica summing circuit, a replica sampling circuit and a control circuit. The replica summing circuit may be a replica of a summing circuit in a SerDes interface and may be configured to provide a summer output signal that is representative of a common mode voltage at an input of the SerDes interface. The replica sampling circuit may be a replica of a sampling circuit in the SerDes interface. The replica sampling circuit may include a first input transistor having a gate that is coupled to the summer output signal, and a second input transistor configured to provide an internal reference voltage at its drain. The drain of the second input transistor may be coupled to a gate of the second input transistor. The control circuit may be configured to control current flow in the replica summing circuit in response to a calibration signal output by the replica sampling circuit.

In some instances, the summer output signal has a voltage level that is defined by an integral of the current flow in the replica summing circuit over a period of time. The period of time may be defined by a clock signal.

In some implementations, the current flow in the replica summing circuit is controlled by a current source that is configured by a calibration code provided by the control circuit. The current source may be further configured based on a tap coefficient defined for a decision-feedback equalizer.

In some implementations, the control circuit is further configured to control current flow in a summing circuit in the SerDes interface in response to the calibration signal output by the replica sampling circuit. The control circuit may be further configured to cause a same level of current to flow in the replica summing circuit and the summing circuit in the SerDes interface.

Figure 11:
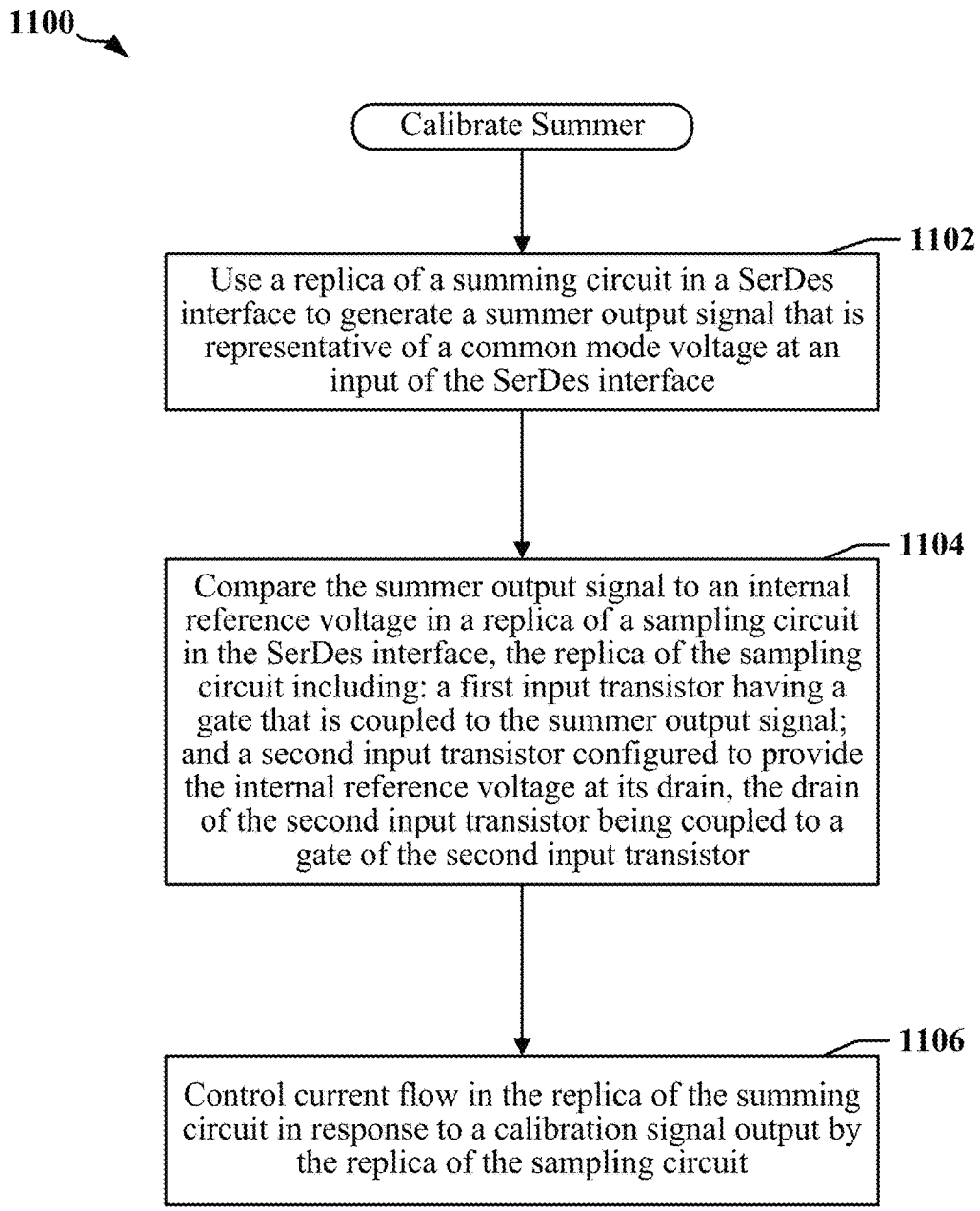
FIG. 11 is a flow diagram illustrating an example of a method for calibrating a summing circuit in a high speed SerDes interface according to certain aspects disclosed herein.

FIG. 11 is a flow diagram illustrating an example of a method 1100 for calibrating a summing circuit in a high speed SerDes interface. In one example, a replica sampling circuit uses and internal reference voltage to generate a calibration signal based on a comparison of the internal reference voltage with a common mode voltage at an input of the SerDes interface. The calibration signal may be used to calibrate a current source that controls current in a replica summing circuit. The replica sampling circuit and the replica summing circuit may be provided in a calibration circuit. Certain aspects of the calibration circuit may correspond to the calibration circuit 700 that is illustrated in FIG. 7 and certain aspects of the replica sampling circuit may correspond to the replica sampling circuit 900 that is illustrated in FIG. 9. Certain portions of the method 1100 may be performed using the processing circuit 1002 illustrated in FIG. 10.

At block 1102, a replica of a summing circuit in a SerDes interface may be used to generate a summer output signal. The summer output signal may be representative of a common mode voltage at an input of the SerDes interface. At block 1104, the summer output signal may be compared to an internal reference voltage in a replica of a sampling circuit in the SerDes interface. The replica of the sampling circuit may include a first input transistor having a gate that is coupled to the summer output signal, and a diode connected, second input transistor that is configured to provide the internal reference voltage at its drain. The drain of the second input transistor may be coupled to a gate of the second input transistor. At block 1106, current flow in the replica of the summing circuit may be controlled in response to a calibration signal output by the replica of the sampling circuit.

In some instances, the summer output signal has a voltage level that is defined by an integral of the current flow in the replica of the summing circuit over a period of time. The period of time may be defined by a clock signal.

In some implementations, current flow in the replica of the summing circuit may be controlled by configuring a current source using a calibration code. Current flow in the replica of the summing circuit may be controlled by configuring a current source based on a tap coefficient defined for a decision-feedback equalizer.

In some implementations, current flow in a summing circuit in the SerDes interface may be controlled in response to the calibration signal output by the replica sampling circuit. In some instances, a same level of current may be caused to flow in the replica of the summing circuit and the summing circuit in the SerDes interface.

The operational steps described in any of the exemplary aspects herein are described to provide a subset of examples of possible implementations. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

In certain aspects, an apparatus includes means for generating a summer output signal that is representative of a common mode voltage at an input of a SerDes interface. The means for generating a summer output signal may include a replica of a summing circuit that is provided in the SerDes interface. The apparatus may include means for comparing the summer output signal to an internal reference voltage in a replica of a sampling circuit in the SerDes interface. The internal reference voltage may be provided by a diode connected transistor. The apparatus may include means for controlling current flow in the replica of the summing circuit based on a calibration signal output by the replica sampling circuit.

In some instances, the summer output signal has a voltage level that is defined by an integral of the current flow in the replica of the summing circuit over a period of time. The period of time may be defined by a clock signal.

In some implementations, the means for controlling current flow in the replica of the summing circuit includes a current source that is configured using a calibration code. means for controlling current flow in the replica of the summing circuit may include a current source that is configured based on a tap coefficient defined for a decision-feedback equalizer.

In some implementations, current flow in a summing circuit in the SerDes interface is configured or adjusted in response to the calibration signal output by the replica sampling circuit. A same level of current may be caused to flow in the replica of the summing circuit and a summing circuit in the SerDes interface.

Some implementation examples are described in the following numbered clauses:

1. A calibration circuit, comprising: a replica summing circuit that is a replica of a summing circuit in a serializer/deserializer (SerDes) interface and that is configured to provide a summer output signal that is representative of a common mode voltage at an input of the SerDes interface; a replica sampling circuit that is a replica of a sampling circuit in the SerDes interface, and that includes: a first input transistor having a gate that is coupled to the summer output signal; and a second input transistor configured to provide an internal reference voltage at its drain, the drain of the second input transistor being coupled to a gate of the second input transistor; and a control circuit configured to control current flow in the replica summing circuit in response to a calibration signal output by the replica sampling circuit.
2. The calibration circuit as described in clause 1, wherein the summer output signal has a voltage level that is defined by an integral of the current flow in the replica summing circuit over a period of time.
3. The calibration circuit as described in clause 2, wherein the period of time is defined by a clock signal.
4. The calibration circuit as described in any of clauses 1-3, wherein the current flow in the replica summing circuit is controlled by a current source that is configured by a calibration code provided by the control circuit.
5. The calibration circuit as described in clause 4, wherein the current flow in the replica summing circuit is controlled by a current source that is configured based on a tap coefficient defined for a decision-feedback equalizer based on a tap coefficient defined for a decision-feedback equalizer.
6. The calibration circuit as described in any of clauses 1-5, wherein the control circuit is further configured to control current flow in a summing circuit in the SerDes interface in response to the calibration signal output by the replica sampling circuit.

7. The calibration circuit as described in any of clauses 1-6, wherein the control circuit is further configured to cause a same level of current to flow in the replica summing circuit and the summing circuit in the SerDes interface.
8. An apparatus, comprising: means for generating a summer output signal that is representative of a common mode voltage at an input of a serializer/deserializer (SerDes) interface, including a replica of a summing circuit that is provided in the SerDes interface; means for comparing the summer output signal to an internal reference voltage in a replica of a sampling circuit in the SerDes interface, the internal reference voltage being provided by a diode connected transistor; and means for controlling current flow in the replica of the summing circuit based on a calibration signal output by the replica sampling circuit.
9. The apparatus as described in clause 8, wherein the summer output signal has a voltage level that is defined by an integral of the current flow in the replica of the summing circuit over a period of time that is defined by a clock signal.
10. The apparatus as described in clause 8 or clause 9, wherein the means for controlling current flow in the replica of the summing circuit comprises: a current source that is configured using a calibration code.
11. The apparatus as described in any of clauses 8-10, wherein the means for controlling current flow in the replica of the summing circuit comprises: a current source that is configured based on a tap coefficient defined for a decision-feedback equalizer.
12. The apparatus as described in any of clauses 8-11, wherein current flow in a summing circuit in the SerDes interface is configured or adjusted in response to the calibration signal output by the replica sampling circuit.
13. The apparatus as described in any of clauses 8-12, wherein a same level of current flows in the replica of the summing circuit and a summing circuit in the SerDes interface.
14. A method for calibrating a summing circuit, comprising: using a replica of a summing circuit in a serializer/deserializer (SerDes) interface to generate a summer output signal that is representative of a common mode voltage at an input of the SerDes interface; comparing the summer output signal to an internal reference voltage in a replica of a sampling circuit in the SerDes interface, the replica of the sampling circuit including: a first input transistor having a gate that is coupled to the summer output signal; and a second input transistor configured to provide the internal reference voltage at its drain, the drain of the second input transistor being coupled to a gate of the second input transistor; and controlling current flow in the replica of the summing circuit in response to a calibration signal output by the replica of the sampling circuit.
15. The method as described in clause 14, wherein the summer output signal has a voltage level that is defined by an integral of the current flow in the replica of the summing circuit over a period of time.
16. The method as described in clause 15, wherein the period of time is defined by a clock signal.
17. The method as described in any of clauses 14-16, wherein controlling current flow in the replica of the summing circuit comprises: configuring a current source using a calibration code.
18. The method as described in any of clauses 14-17, wherein controlling current flow in the replica of the summing circuit comprises: configuring a current source based on a tap coefficient defined for a decision-feedback equalizer.
19. The method as described in any of clauses 14-18, further comprising: controlling current flow in a summing circuit in the SerDes interface in response to the calibration signal output by the replica sampling circuit.
20. The method as described in any of clauses 14-19, further comprising: causing a same level of current to flow in the replica of the summing circuit and a summing circuit in the SerDes interface.
21. A calibration circuit, comprising: a replica summer that includes a pair of summing input transistors, each summing input transistor having: a gate configured to receive an input signal representative of a common mode voltage of an input to an analog front-end circuit, a drain coupled to a summer output signal, and a source coupled to at least one summer source transistor that is configured to control currents flowing in the pair of summing input transistors; and a replica sampling circuit having a pair of sampling input transistors, including a first sampling input transistor that comprises: a gate configured to receive the summer output signal, a source coupled to a sampling source transistor that is configured to control currents flowing in each of the sampling input transistors, and a drain coupled to a first feedback signal, wherein a second sampling input transistor is a diode connected transistor that has a gate and a drain coupled to a second feedback signal.
22. The calibration circuit as described in clause 21, wherein the first feedback signal and the second feedback signal are provided as a differential input to a current source control circuit that has a control output that is coupled to a gate of the at least one summer source transistor.
23. The calibration circuit as described in clause 22, wherein the current source control circuit comprises: a current source that is configured using a calibration code.
24. The calibration circuit as described in clause 22 or clause 23, wherein the current source control circuit comprises: a current source that is configured based on a tap coefficient defined for a decision-feedback equalizer.
25. The calibration circuit as described in any of clauses 21-24, wherein the replica summing circuit is at least a partial replica of a current summer of a serializer/deserializer (SerDes) interface, and wherein the replica sampling circuit is at least a partial replica of a sampler of the SerDes interface.
26. The calibration circuit as described in clause 25, wherein a same level of current flows in the pair of summing input transistors and a corresponding pair of transistors in the current summer of the SerDes interface.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure.

Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A calibration circuit, comprising:
    a replica summer that includes a pair of summing input transistors, each summing input transistor having:
        a gate configured to receive an input signal representative of a common mode voltage of an input to an analog front-end circuit,
        a drain coupled to a summer output signal, and
        a source coupled to at least one summer source transistor that is configured to control currents flowing in the pair of summing input transistors; and
    a replica sampling circuit having a pair of sampling input transistors, including a first sampling input transistor that comprises:
        a gate configured to receive the summer output signal,
        a source coupled to a sampling source transistor that is configured to control currents flowing in each of the sampling input transistors, and
        a drain coupled to a first feedback signal,
    wherein a second sampling input transistor is a diode connected transistor that has a gate and a drain coupled to a second feedback signal.

2. The calibration circuit of claim 1, wherein the first feedback signal and the second feedback signal are provided as a differential input to a current source control circuit that has a control output that is coupled to a gate of the at least one summer source transistor.

3. The calibration circuit of claim 2, wherein the current source control circuit comprises:
    a current source that is configured using a calibration code.

4. The calibration circuit of claim 2, wherein the current source control circuit comprises:
    a current source that is configured based on a tap coefficient defined for a decision-feedback equalizer.

5. The calibration circuit of claim 1, wherein the replica summing circuit is at least a partial replica of a current summer of a serializer/deserializer (SerDes) interface, and wherein the replica sampling circuit is at least a partial replica of a sampler of the SerDes interface.

6. The calibration circuit of claim 5, wherein a same level of current flows in the pair of summing input transistors and a corresponding pair of transistors in the current summer of the SerDes interface.

* * * * *